United States Patent
Thibault

(10) Patent No.: US 7,349,787 B2
(45) Date of Patent: Mar. 25, 2008

(54) METHOD OF SERVO-CONTROL IN A BRAKING SYSTEM HAVING ELECTRIC BRAKES

(75) Inventor: Julien Thibault, Palaiseau (FR)

(73) Assignee: Messier-Bugatti, Velizy Villacoublay (FR)

( * ) Notice: Subject to any disclaimer, the term of this patent is extended or adjusted under 35 U.S.C. 154(b) by 318 days.

(21) Appl. No.: 11/134,361

(22) Filed: May 23, 2005

(65) Prior Publication Data

US 2006/0195244 A1 Aug. 31, 2006

(30) Foreign Application Priority Data

Feb. 25, 2005 (FR) .................................. 05 01935

(51) Int. Cl.
*G06F 7/70* (2006.01)
*G06F 19/00* (2006.01)
(52) U.S. Cl. ............................. 701/70; 701/83; 303/20; 303/155; 188/206 R
(58) Field of Classification Search ................. 701/70, 701/71, 83; 303/20, 155; 188/181 T, 182, 188/206 R See application file for complete search history.

(56) References Cited

U.S. PATENT DOCUMENTS

| 6,000,507 | A | 12/1999 | Boehm et al. |
| 6,178,369 | B1 | 1/2001 | Boehm |
| 2001/0030462 | A1 | 10/2001 | Disser |
| 2004/0232762 | A1 | 11/2004 | Maron |

FOREIGN PATENT DOCUMENTS

EP 1 186 495 A1 3/2002

*Primary Examiner*—Gertrude A. Jeanglaude
(74) *Attorney, Agent, or Firm*—Sughrue Mion, PLLC

(57) ABSTRACT

The invention relates to a method of servo-control in a vehicle brake system including at least one electric brake having at least one actuator comprising a pusher facing friction elements and driven by an electric motor to apply a force selectively against the friction elements in response to a braking setpoint, the method making use of a plurality of relationships between various operating parameters of the actuator including a relationship between a pusher position and a corresponding force applied by the pusher to the friction elements. According to the invention, the method comprises the step of adjusting a particular relationship between position and force.

6 Claims, 2 Drawing Sheets

US 7,349,787 B2

METHOD OF SERVO-CONTROL IN A BRAKING SYSTEM HAVING ELECTRIC BRAKES

The invention relates to a method of servo-control in a braking system having electric brakes.

BACKGROUND OF THE INVENTION

Modern aircraft have braking systems including electric brakes provided with electromechanical actuators.

Each actuator comprises a pusher facing a stack of disks and moved under drive from an electric motor to apply a braking force on the stack of disks in selective manner.

Such brakes are generally under force control based on a braking setpoint.

The invention applies more particularly to an actuator provided with a sensor for sensing pusher position, but not including a force sensor capable of measuring the force applied by the pusher against the stack of disks.

Under such circumstances, in order to be able to servo-control the force applied by such actuators, it is necessary to estimate the force being applied by a pusher as a function of parameters that can be measured, such as the position of the pusher, or indeed the power supply current being drawn by the electric motor.

Alternatively, the braking setpoint can be converted into a position setpoint, whereupon position servo-control can be performed.

The servo-control that is implemented generally depends on parameters, relationships, and models that are estimated a priori. However, the conditions under which a brake operates can change during the lifetime of the brake, thus making servo-control thereof less accurate.

OBJECT OF THE INVENTION

An object of the invention is to provide a method for countering a possible drop in servo-control performance during the lifetime of a brake.

BRIEF DESCRIPTION OF THE INVENTION

To achieve this object, the invention provides a method of servo-control in a vehicle brake system including at least one electric brake having at least one actuator comprising a pusher facing friction elements and driven by an electric motor to apply a force selectively against the friction elements in response to a braking setpoint, the method making use of a plurality of relationships between various operating parameters of the actuator including a relationship between a pusher position and a corresponding force applied by the pusher to the friction elements, and according to the invention, the method includes the step of adjusting said particular relationship between position and force.

It has been found that this relationship is very sensitive to friction element wear. Adjusting the relationship in accordance with the invention makes it possible to compensate drift in the operating conditions of the brake due to said friction element wear.

Preferably, the adjustment step comprises the following operations:

operating the brake under operating conditions in which the force applied by the pusher against the friction elements depends essentially on a power supply current flowing through the electric motor;

in one or more positions of the pusher, measuring the power supply current of the electric motor, and deducing a corresponding force therefrom; and from the position and force pairs determined in this way, deducing a correction for the relationship between position and force.

In a first particular implementation of the invention, said operating conditions comprise moving the pusher at constant speed.

In a second particular implementation of the invention, the operating conditions include one or more pauses in the position of the pusher.

In a third particular implementation of the invention, said operating conditions comprise periodically displacing the pusher with small amplitude about an operating point.

In which case, and preferably, the periodic displacement is implemented in superposition on a controlled displacement of the pusher in response to the braking setpoint.

Advantageously, the adjustment step is implemented at least once per utilization cycle of the vehicle.

BRIEF DESCRIPTION OF THE DRAWINGS

The invention will be better understood in the light of the following description given with reference to the figures of the accompanying drawings, in which.

DETAILED DESCRIPTION OF THE INVENTION

Figure 1:
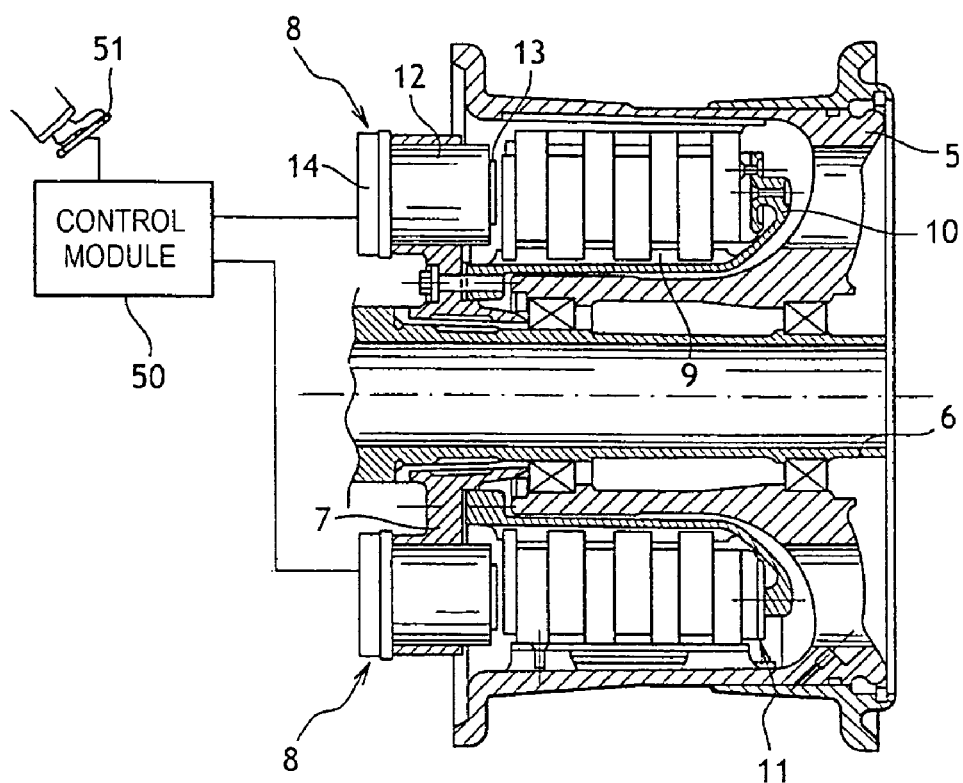
FIG. 1 is a section view of an electric brake having electromechanical actuators.

The method of the invention is described in detail herein in application to an aircraft that has some number of braked wheels, of the kind shown in FIG. 1. Each of the braked wheels comprises a rim 5 suitable for receiving a tire (not shown) and mounted to rotate on an axle 6 carried by one of the undercarriages of the aircraft. The axle 6 has mounted thereon a ring 7 carrying actuators 8. A torsion tube 9 is secured to the ring 7 and extends into the rim 5 and terminates with a backstop 10. The ring 7, and thus the torsion tube 9, are prevented from turning relative to the axis 6 by keying means (not shown).

Between the rest 10 and the actuators 8 there extends a stack of disks 11 made up of rotor disks that are constrained in rotation with the rim 5, and stator disks that are constrained in rotation with the torsion tube 9.

Each of the actuators 8 comprises a body 12 in which a pusher 13 is mounted facing the stack of disks 11 to move linearly under drive from an electric motor contained inside the body 11 so as to apply a force selectively to the stack of disks 11, which force, by inducing friction forces between the rotors and the stators in the stack of disks, contributes to slowing down rotation of the rim 5, thereby braking the aircraft. Each of the actuators 8 includes a position sensor 14 for measuring the linear displacements of the pusher 13.

The actuators 8 are associated with a control module 50 capable of operating in a controlled mode in which each pusher 13 is moved relative to the stack of disks 11 by the associated electric motor in response to a braking setpoint which is generated in particular on the basis of signals coming from brake pedals 51 actuated by the pilot.

In such actuators, the torque imposed by the motor on the motor and gearbox unit for transforming the rotary motion of the motor into linear movement in translation of the pusher is directly proportional to the magnitude of the current feeding the motor. This can be written as Cem=K.i where Cem is the electromagnetic torque, K is a proportionality coefficient, and $i$ is the power supply current drawn by the electric motor.

Nevertheless, not all of the electromagnetic torque Cem is consumed in the action exerted by the pusher 13 against the stack of disks. Some fraction of the electromagnetic torque Cem is consumed to overcome inertial effects (acceleration or deceleration of the pusher and the associated moving masses). Another fraction of the electromagnetic torque Cem is consumed to compensate for static friction and for viscous friction (i.e. friction that depends on speed) opposing the displacement of the pusher 13. This can be written as follows:

$Cem=Ci+Cfs+Cfv+Cu$ where:
Ci is the inertial torque;
Cfs is the static friction torque;
Cfv is the viscous friction torque; and
Cu is the useful torque.

The useful torque gives rise to a force F such that Cu=a.η.F, where $a$ is a transmission coefficient directly associated with the configuration of the motor and gearbox unit, and where η is the efficiency of said transmission.

Figure 2:
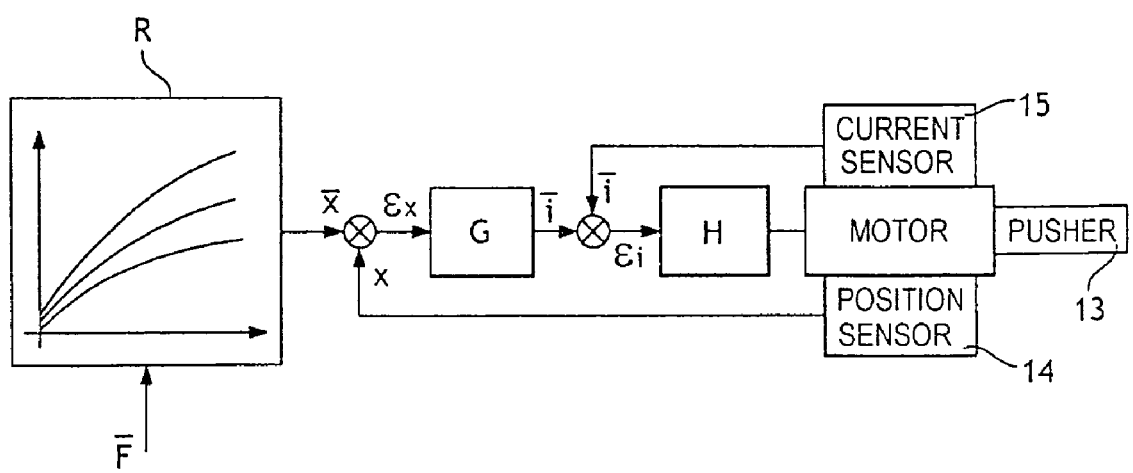
FIG. 2 is a block diagram of the servo-control used for controlling the actuators.

The control module 50 is adapted to servo-control the actuators in the manner illustrated by FIG. 2.

The braking setpoint $\overline{F}$ is initially transformed into a position setpoint $\overline{x}$. For this purpose, use is made of a relationship R between the position of the pusher 13 and the force exerted by the pusher 13 on the stack of disks 11.

This setpoint $\overline{x}$ forms the input to a position feedback loop. This setpoint is subtracted from the position $x$ of the pusher 13 as measured by the position sensor 14.

The resulting difference $\epsilon_x$ is processed by a first transfer function G of the PID (proportional integral differential) type so as to be transformed into a current setpoint $\overline{i}$. This setpoint has subtracted therefrom the current $i$ as measured by the current sensor 15 which in this case is integrated in the control module 50.

The resulting difference $\epsilon_i$ is then processed by a transfer function H (a PID) and is then delivered to the electric motor of the actuator.

It has been found that the relationship R between position and the force exerted by the pusher is particularly sensitive to disk wear. A specific object of the invention is to adjust this relationship R to take account of such wear.

For this purpose, and in the particular implementations described above, forces $F_p$ corresponding to a plurality of positions $x_p$ of the pusher are estimated, and the resulting estimated pairs $(x_p, F_p)$ are used for adjusting the relationship R between position and force, e.g. by using a conventional regression method.

Figure 3A:
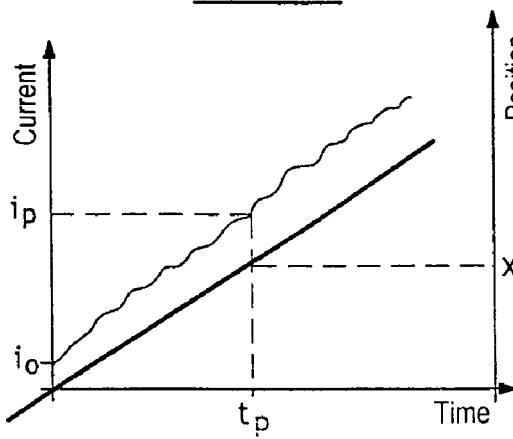
FIG. 3A is a graph showing how the position (bold line) and the power supply current (fine line) vary as a function of time in a first particular implementation of the method of the invention.
Figure 3B:
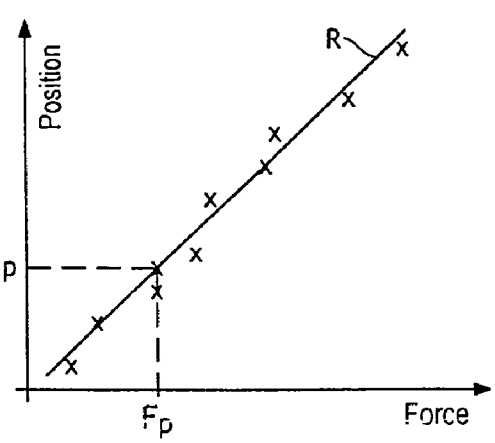
FIG. 3B is a graph showing how the relationship between force and pusher position is adjusted in the first implementation.

In a first particular implementation of the method of the invention as shown in FIGS. 3A and 3B, the pusher 13 is caused to advance at constant speed.

Since its speed is kept constant, the effects of inertia are zero, such that the torque Ci is zero. Care is also taken to maintain the speed at a value that is low enough to ensure that the viscous friction force Cfv always remains negligible.

In graph 3A, the bold curve representing the positions taken by the pusher 13 is then in the form of a straight line, with the time origin being taken at the moment the pusher 13 comes into contact with the stack of disks 11.

During a first stage in which the pusher 13 is not in contact with the stack of disks, the useful torque Cu is zero, such that the entire electromagnetic torque serves to overcome static friction. By measuring the power supply current $i_0$ in this situation, a measurement is obtained of the static friction:

$Cf=K.i_0$

The current $i_0$ is visible on the fine line curve for current. It is the constant current taken by the motor before the pusher 13 comes into contact with the stack of disks 11.

During a second stage in which the pusher 13 is in contact with the stack of disks 11, the useful torque is not zero and can be deduced directly from the measured current $i$:

$Cu=K.(i-i_0)$

In the invention, at a plurality of positions $x_p$ for which the pusher 13 is in contact with the stack of disks 11, the corresponding power supply current $i_p$ is measured while the pusher 13 continues to move at constant speed. Each measured current is associated with a force by the following relationship:

$F_p=K.(i_p-i_0)/a\eta$

In the graph of FIG. 3A, there can be seen for an instant $t_p$, the corresponding position measurement $x_p$ (right-hand axis) and the corresponding power supply current $i_p$ (on the left-hand axis).

By repeating these measurements several times over, and by associating each measured current $i_p$ with a force $F_p$ using the above relationship, a series of pairs $(x_p, F_p)$ is obtained as represented by crosses on the graph of FIG. 3B. These pairs are used in the invention to adjust the relationship R that is used in performing servo-control between position and force.

For example, if the servo-control makes use of a relationship R of the form x=αF+β, then the coefficients α and β are adjusted in conventional manner using conventional regression formulae.

This adjustment step is preferably implemented after the undercarriages have been lowered and before the aircraft lands. Thus, the relationship R between position and force is readjusted prior to each landing so as to take account of the state of wear of the disks.

Figure 4A:
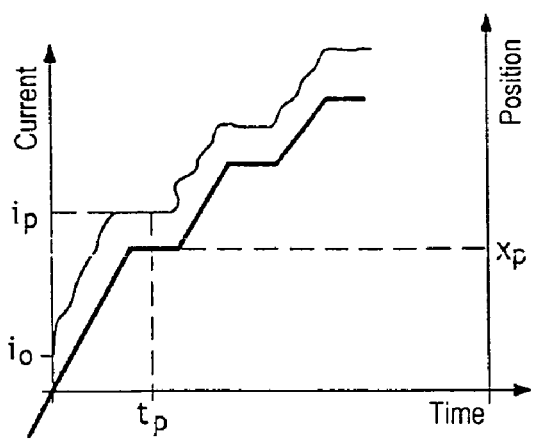
FIG. 4A is a graph showing variation in the position (bold line) and in the power supply current (fine line) vary as a function of time in a second particular implementation of the method of the invention.
Figure 4B:
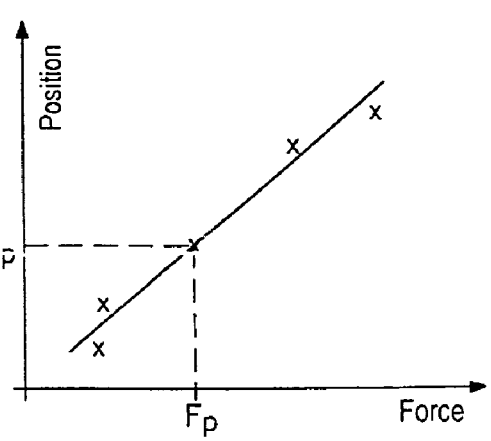
FIG. 4B is a graph showing how the relationship between force and pusher position is adjusted in the second implementation.

In a second particular implementation of the method of the invention as shown in FIGS. 4A and 4B, the corresponding power supply current $i_p$ is measured while the pusher 13 is held stationary in said position. Under such conditions, the inertial torque Ci and the viscous friction torque Cfv are zero.

To this end, and as can be seen in FIG. 4A, the pusher 13 is caused to move with some number of pauses during which the pusher 13 remains stationary. In the graph of FIG. 4A, there can be seen the position $x_p$ and the current $i_p$ that correspond to an instant $t_p$ taken during one of these pauses.

By taking care to make use of positions in which the useful torque Cu is much greater than the static friction torque Cf, i.e. in which the power supply current $i_p$ is much greater than the current $i_0$, it is possible to estimate a corresponding force $F_p$ on the basis of the measured power supply current $i_p$ by using the following relationship:

$$F_p = K.i_p/a.\eta$$

By repeating these measurements several times over, and by associating each measured current $i_p$ with a force $F_p$ using the above-explained relationship, a series of pairs $(x_p, F_p)$ is obtained as illustrated by crosses on the graph of FIG. 4B. These pairs are used in accordance with the invention to adjust the relationship R that is used for servo-controlling position and force.

Figure 5A:
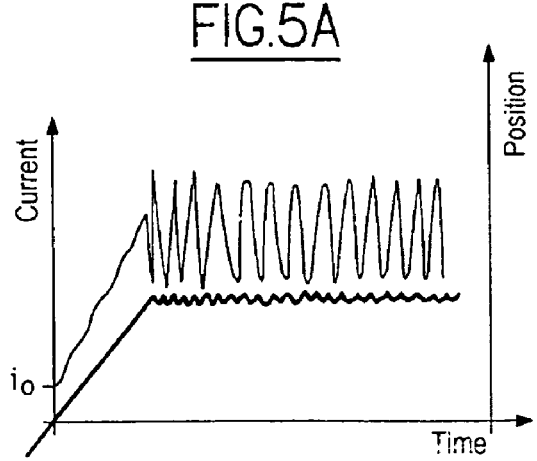
FIG. 5A is a graph showing variation in the position (bold line) and the power supply current (fine line) vary as a function of time in a third particular implementation of the method of the invention.

In a third particular implementation of the method of the invention, while the pusher 13 is in a position in contact with the stack of disks 11, a periodic displacement of small amplitude is applied thereto, as shown in FIG. 5A.

Under such circumstances, the inertial torque, the static friction torque Cfs, and the viscous friction torque Cfv have an average value of zero, such that on average the useful torque Cu is directly equal to the electromagnetic torque Cem.

The associated force is thus estimated by the following relationship:

$$F_p = K.i_p/a\eta'$$

where $i_p$ in this case is an average of the power supply current during the periodic displacement of the pusher, and $\eta'$ is a weighted efficiency taking account of the fact that the efficiency of the actuator differs depending on whether the pusher 13 is moving in one direction or in the opposite direction.

Figure 5B:
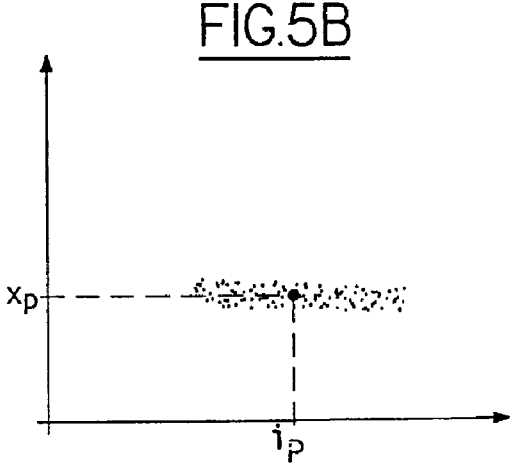
FIG. 5B is a graph showing how a force/position pair is obtained in the third implementation.

In order to establish this average, the power supply current $i_j$ is measured at a variety of positions $x_j$. The resulting pairs $(x_j, i_j)$ are represented by points in the graph of FIG. 5B. The mean of the positions $x_j$ is then determined, which is retained as a measured position $x_p = <x_j>$, and the mean of the currents $i_j$ is obtained which is used as the associated power supply current $i_p = <i_j>$.

The force $F_p$ is deduced from this current $i_p$ in application of the above-stated relationship.

By repeating this operation several times over, a series of pairs $(x_p, F_p)$ is obtained. These pairs are used in the invention to adjust the relationship R between position and force as used for servo-control purposes.

It should be observed that these measurements can be taken while the actuator 8 is being servo-controlled to track the braking setpoint F. It suffices to superpose small-amplitude periodic movements at a frequency higher than the frequencies characteristic of the braking system on the displacements of the pusher 13 in response to the braking setpoint F.

By adjusting the relationship between position and force of the pusher it is possible significantly to improve the performance of the electric brake. By way of numerical example, on a brake for a commercial aircraft of the Airbus A320 or Boeing 737 type, the case is considered of a braking setpoint that is equal to the maximum force for which the brake is deigned. At this setpoint, a fixed and non-adjustable relationship R would produce a displacement setpoint of the order of 2 millimeters regardless of the state of wear of the disks.

When implementing the step of adjusting the relationship R in accordance with the invention, the displacement setpoint becomes about 1.6 millimeters for a stack of new disks and about 2.3 millimeters for a stack of worn disks, giving differences of the order of ±15% relative to the setpoint obtained from a non-adjusted relationship.

At one extreme, this adjustment serves to avoid applying pointless excess pressure to the stack of disks, pointlessly fatiguing the brake and prematurely wearing down the disks, and at the other extreme it avoids applying insufficient force, leading to poor braking performance.

The invention is not limited to the above description, and on the contrary covers any variation coming within the ambit defined by the claims.

In particular, although it is stated that the adjustment step is implemented on each flight of the aircraft, i.e. on each utilization cycle thereof, the adjustment step could be implemented in other circumstances, for example in response to the friction elements crossing a wear threshold, or indeed periodically, once every ten flights or 100 flights, or when replacing friction elements, or indeed when performing maintenance in a workshop.

Although it is stated that a linear type relationship is used between pusher position and force, the invention is not limited to relationships of this type; the relationship could be non-linear.

Although the braking setpoint as described herein is a force setpoint, it is also possible to apply the invention when the setpoint is expressed in terms of a percentage of a maximum force.

What is claimed is:

1. A method of servo-control in a vehicle brake system including at least one electric brake having at least one actuator comprising a pusher that faces friction elements and is driven by an electric motor to apply a force selectively against the friction elements in response to a braking setpoint, the method making use of a plurality of relationships between various operating parameters of the actuator including a relationship between a pusher position and a corresponding force applied by the pusher to the friction elements, the method comprising:

adjusting said particular relationship between said pusher position and said corresponding force, wherein said adjustment comprises:
   operating the brake under operating conditions in which the force applied by the pusher against the friction elements depends essentially on a power supply current flowing through the electric motor;
   in at least one position of the pusher, measuring the power supply current of the electric motor and deducing a corresponding force therefrom; and
   from said at least one position and said corresponding force, deducing a correction for the relationship between pusher position and corresponding force.

2. A method according to claim 1, wherein said operating conditions comprise moving the pusher at constant speed.

3. A method according to claim 1, wherein the operating conditions include one or more pauses in the position of the pusher.

4. A method according to claim 1, wherein said operating conditions comprise periodically displacing the pusher with small amplitude about an operating point.

5. A method according to claim 4, wherein the periodic displacement is superposed on a controlled displacement of the pusher in response to the braking force setpoint.

6. A method according to claim 1, wherein the adjustment step is implemented at least once per utilization cycle of the vehicle.

* * * * *